US012596497B2

(12) United States Patent
Kim et al.

(10) Patent No.: US 12,596,497 B2
(45) Date of Patent: Apr. 7, 2026

(54) DATA STORAGE SYSTEM AND METHOD OF MANAGING METADATA THEREOF

(71) Applicant: SK hynix Inc., Gyeonggi-do (KR)

(72) Inventors: Hyun Chul Kim, Gyeonggi-do (KR); Jung Min Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/920,994

(22) Filed: Oct. 21, 2024

(65) Prior Publication Data

US 2025/0251871 A1      Aug. 7, 2025

(30) Foreign Application Priority Data

Feb. 5, 2024      (KR) ........................ 10-2024-0017563

(51) Int. Cl.
G06F 3/06               (2006.01)
(52) U.S. Cl.
CPC .......... G06F 3/0644 (2013.01); G06F 3/0604 (2013.01); G06F 3/0673 (2013.01)
(58) Field of Classification Search
CPC ..... G06F 3/0644; G06F 3/0604; G06F 3/0673
See application file for complete search history.

(56) References Cited

U.S. PATENT DOCUMENTS

| | | | | |
|---|---|---|---|---|
| 9,792,298 | B1 * | 10/2017 | Taylor ................. | G06F 16/1844 |
| 2005/0273451 | A1 * | 12/2005 | Clark ...................... | G06F 16/10 |
| 2014/0149709 | A1 * | 5/2014 | Horman ................ | G06F 3/0608 |
| | | | | 711/170 |

| | | | | |
|---|---|---|---|---|
| 2015/0280959 | A1 | 10/2015 | Vincent | |
| 2017/0285973 | A1 | 10/2017 | Dalmatov | |
| 2017/0300581 | A1 * | 10/2017 | Westbrook .......... | G06F 3/04886 |
| 2018/0150243 | A1 * | 5/2018 | Beard ..................... | G06F 3/065 |
| 2020/0356288 | A1 * | 11/2020 | Dronamraju ......... | G06F 3/0605 |
| 2021/0081116 | A1 | 3/2021 | Klein et al. | |

(Continued)

FOREIGN PATENT DOCUMENTS

| | | |
|---|---|---|
| KR | 10-2021-0039871 A | 4/2021 |
| KR | 10-2023-0031123 A | 3/2023 |
| KR | 10-2024-0148519 A | 10/2024 |

OTHER PUBLICATIONS

Extended European Search Report for European Patent Application No. 25156039.7 issued by the European Patent Office on May 28, 2025.

*Primary Examiner* — Ryan Bertram
(74) *Attorney, Agent, or Firm* — IP & T GROUP LLP

(57) ABSTRACT

Provided herein may be a data storage system. The data storage system may include a plurality of memory devices, each including a metadata area and a data storage area, and a memory pool manager configured to allocate partial data storage areas of data storage areas to a plurality of host devices, respectively, in response to data storage area allocation requests received from the plurality of host devices, wherein the memory pool manager is configured to generate a plurality of sub-metadata areas by partitioning each metadata area, allocate the plurality of sub-metadata areas to the plurality of host devices, respectively, to correspond to the partial data storage areas allocated to the plurality of host devices and change sizes and locations of the plurality of sub-metadata areas based on at least one of health information of the plurality of memory devices and a metadata area setting request.

20 Claims, 6 Drawing Sheets

| HOST ID | Metadata Start Address | Offset Size | Error Information | |
|---|---|---|---|---|
| HOST #1 | 0x4000 | 0x40 | Error Status #1 | |
| HOST #2 | 0x8000 | 0x80 | Error Status #2 | |
| HOST #1 | 0x4040 | 0x40 | Error Status #1 | ~630 |

(56)                References Cited

U.S. PATENT DOCUMENTS

2024/0385747 A1\*  11/2024  Suh ...................... G06F 3/0644
2025/0130727 A1\*   4/2025  Choi ..................... G06F 3/0634
2025/0258765 A1\*   8/2025  Roberts .............. G06F 12/0223

\* cited by examiner

| HOST ID | Metadata Start Address | Offset Size | Error Information |
|---------|------------------------|-------------|-------------------|
| HOST #1 | 0x4000 | 0x40 | Error Status #1 |
| HOST #2 | 0x8000 | 0x80 | Error Status #2 |

| HOST ID | Metadata Start Address | Offset Size | Error Information |
|---------|------------------------|-------------|-------------------|
| HOST #1 | 0x4000 | 0x40 | Error Status #1 |
| HOST #2 | 0x8000 | 0x80 | Error Status #2 |
| HOST #1 | 0x4040 | 0x40 | Error Status #1 |

| HOST ID | Metadata Start Address | Offset Size | Error Information |
|---------|------------------------|-------------|-------------------|
| HOST #1 | 0x4000 | 0x40 | Error Status #1 |
| HOST #2 | 0x8000 | 0x80 | Error Status #2 |

| HOST ID | Metadata Start Address | Offset Size | Error Information |
|---------|------------------------|-------------|-------------------|
| HOST #2 | 0x8000 | 0x80 | Error Status #2 |
| HOST #1 | 0x9000 | 0x80 | Error Status #1 |

DATA STORAGE SYSTEM AND METHOD OF MANAGING METADATA THEREOF

CROSS-REFERENCE TO RELATED APPLICATION

The present application claims priority under 35 U.S.C. § 119 (a) to Korean patent application number 10-2024-0017563 filed on Feb. 5, 2024, the entire disclosure of which is incorporated by reference herein.

BACKGROUND

1. Field of Invention

Various embodiments of the present disclosure generally relate to a data storage system, and more particularly to a data storage system and a method of managing metadata thereof.

2. Description of Related Art

Memory devices are classified into volatile memory devices and nonvolatile memory devices. A volatile memory device may retain data stored therein only when power is supplied and may lose the stored data when the supply of power is interrupted. A nonvolatile memory device may retain data stored therein even when the supply of power is interrupted.

A memory system may include memory devices. The memory system may allocate a parity area to metadata of a user, and may store the metadata of the user in the parity area. As the parity area allocated to the metadata increases, the reliability of the memory devices may be deteriorated.

A memory pool may be a form of sharing a plurality of memory devices. The memory pool may provide memory areas allocated to a plurality of host devices. Metadata corresponding to each host device may be stored in the corresponding memory area. The size of the stored metadata may vary in accordance with the host devices.

SUMMARY

Various embodiments of the present disclosure are directed to a data storage system and a method of managing metadata thereof, which partition a metadata area set in a memory pool and allocate partitioned metadata areas to host devices, respectively.

An embodiment of the present disclosure may provide for a data storage system. The data storage system may include a plurality of memory devices, each including a metadata area and a data storage area, and a memory pool manager configured to allocate partial data storage areas of data storage areas to a plurality of host devices, respectively, in response to data storage area allocation requests received from the plurality of host devices, wherein the memory pool manager is configured to generate a plurality of sub-metadata areas by partitioning each metadata area, allocate the plurality of sub-metadata areas to the plurality of host devices, respectively, to correspond to the partial data storage areas allocated to the plurality of host devices, respectively, and change sizes and locations of the plurality of sub-metadata areas based on at least one of health information of the plurality of memory devices and a metadata area setting request received from the plurality of host devices.

An embodiment of the present disclosure may provide for a method of operating a data storage system. The method may include allocating a first sub-metadata area partitioned from metadata areas included in a plurality of memory devices to a host device to which a partial data storage area of data storage areas included in the plurality of memory devices is allocated among a plurality of host devices, based on initial setting information, generating a partition table including partition information of the metadata area, changing a size and a location of the first sub-metadata area, at least one of health information of the plurality of memory devices and a metadata area setting request, updating the partition table in response to the changed first sub-metadata area, and performing a migration operation on metadata stored in the first sub-metadata area.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
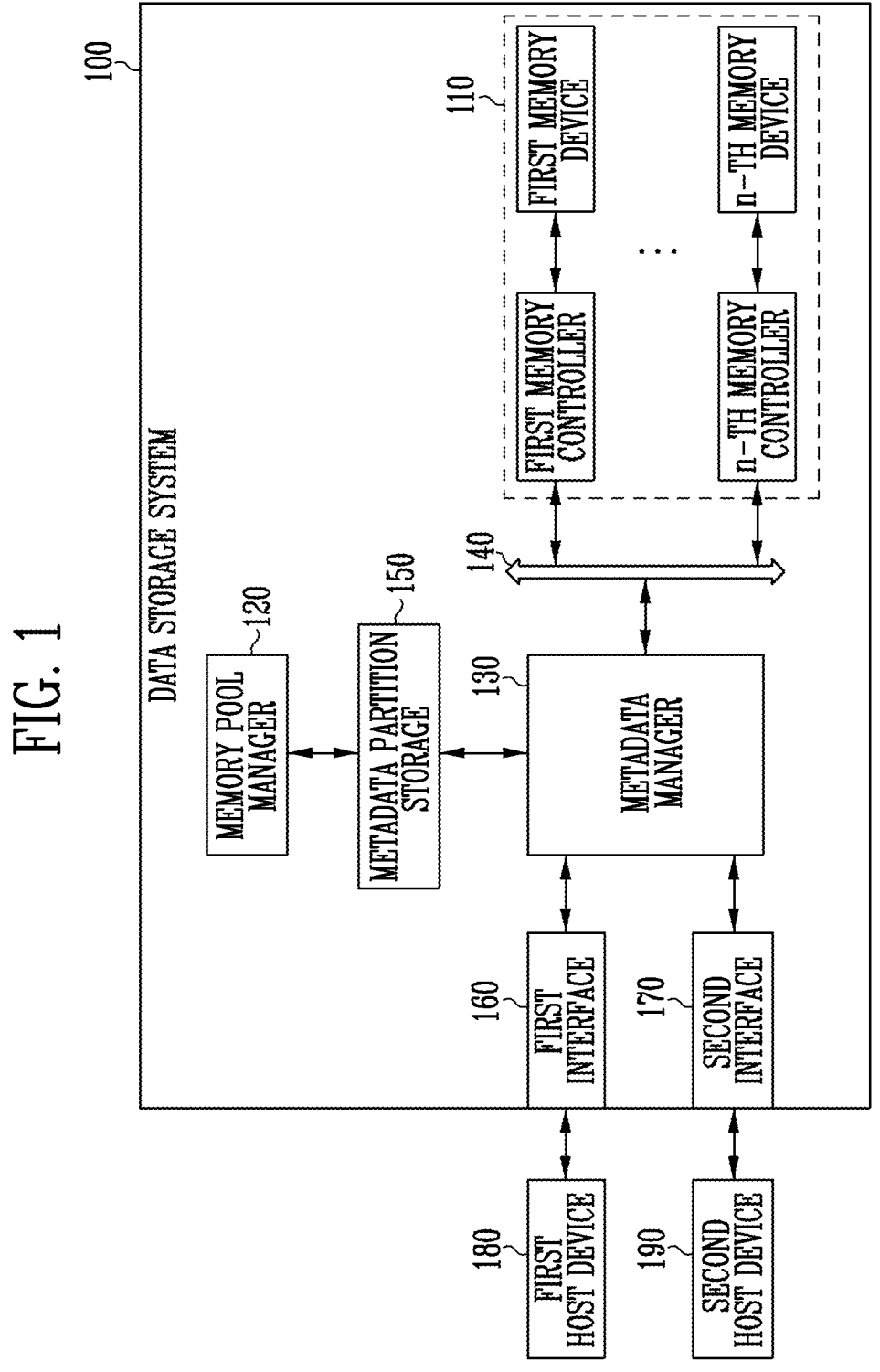
FIG. 1 is a diagram illustrating a data storage system according to an embodiment of the present disclosure.

FIG. 1 is a diagram illustrating a data storage system 100 according to an embodiment of the present disclosure.

Referring to FIG. 1, the data storage system 100 may transmit/receive data to/from host devices. Although first and second host devices 180 and 190 are illustrated in FIG. 1, this illustration is provided for convenience of description, and the number of host devices communicating with the data storage system 100 may vary. The data storage system 100 may include a memory pool 110, a memory pool manager 120, a metadata manager 130, and a metadata partition storage 150.

The memory pool 110 may include memory devices and memory controllers. A memory pool area may be generated based on the memory devices included in the memory pool 110. FIG. 1 illustrates an example of the case where the memory pool 110 includes n memory devices and n memory controllers for controlling the n memory devices, respectively.

Although the memory devices included in the memory pool 110 may be, for example, volatile memories such as DRAM, SDRAM, DDR SDRAM, LPDDR SDRAM, and GRAM, the embodiments of the present disclosure are not limited thereto. In an embodiment of the present disclosure, the memory devices may be nonvolatile memories. Further, only a single memory device may be included in the memory pool 110.

In FIG. 1, a memory pool area may be allocated to the first host device 180 or the second host device 190. The memory pool area may include memory areas allocated to host devices and a metadata area in which metadata is stored. In an embodiment of the present disclosure, the memory areas may be data storage areas in which user data is stored.

The first host device 180 or the second host device 190 may be a computer, a tablet, a mobile phone, a smartphone, a storage forming a data center, one of various electronic devices constituting a home network, one of various electronic devices constituting a telematics network, a radio frequency identification (RFID) device, a mobile device (e.g., a vehicle, a robot, or a drone) that is driving under human control or is autonomously driven, or the like. The first host device 180 or the second host device 190 is not limited to the above-described examples, and may be any one of various types of electronic devices requiring the data storage system 100 that is capable of storing data, in addition to the above-described examples.

The data storage system 100 may communicate with the first host device 180 through a first interface 160, and may communicate with the second host device 190 through a second interface 170. In an embodiment of the present disclosure, the first interface 160 and the second interface 170 may be compute express link (CXL) interfaces. In a structure in which the data storage system 100 including the plurality of memory devices communicates with host devices through the CXL interfaces, a low-latency, high-bandwidth access environment may be implemented. In an embodiment of the present disclosure, the first interface 160 and the second interface 170 may not be limited to the CXL interfaces. For example, the data storage system 100 may communicate with the host devices through at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, and an integrated drive electronics (IDE) protocol.

The memory pool manager 120 may allocate the memory pool area to each of the first host device 180 and the second host device 190. The memory pool manager 120 may generate sub-metadata areas by partitioning the metadata area included in the memory pool area. In an embodiment of the present disclosure, the memory pool manager 120 may generate a first sub-metadata area and allocate the first sub-metadata area to the first host device 180, and may generate a second sub-metadata area and allocate the second sub-metadata area to the second host device 190.

The memory pool manager 120 may set the size of metadata of each of the host devices based on information received from a manager which controls the host devices. The memory pool manager 120 may determine a highly reliable area in the corresponding memory pool area to be a metadata area based on reliability information obtained through an initialization operation on the memory pool area.

The memory pool manager 120 may determine the locations of allocated sub-metadata areas in the metadata area.

The memory pool manager 120 may generate a partition table including identification information, location information, size information and error information of the host device, which correspond to each of the sub-metadata areas. The memory pool manager 120 may store the generated partition table in the metadata partition storage 150.

The memory devices included in the memory pool 110 may transfer health information of the memory devices to the memory pool manager 120. The memory pool manager 120 may generate error information corresponding to each of the sub-metadata areas based on the received health information. In an embodiment of the present disclosure, the error information may indicate error correction information of each sub-metadata area.

The metadata manager 130 may control the memory controllers and the memory devices included in the memory pool 110 to store metadata corresponding to each of the host devices in sub-metadata areas or to read the metadata stored in each sub-metadata area, based on the partition table stored in the metadata partition storage 150. In response to a read request or a write request for the memory pool 110, the metadata manager 130 may determine a sub-metadata area corresponding to the read request or the write request among the sub-metadata areas, based on the partition table. The read request or the write request for the memory pool 110 may be a read request or a write request for a data storage area. The metadata manager 130 may generate a read request or a write request for metadata in the sub-metadata area corresponding to the read request or the write request, and may transfer the generated read request or write request to the memory pool 110.

In FIG. 1, the metadata manager 130 and the memory pool 110 may be coupled to each other through a bus 140. For example, a read request for metadata may be transferred to a first memory controller through the bus 140, and data read from a first memory device may be transferred through the bus 140. Similarly, a write request for metadata and the metadata may be transferred to a second memory controller through the bus 140, and the metadata may be stored in a second memory device.

The memory pool manager 120 may change the sizes and locations of sub-metadata areas based on at least one of the health information of the memory devices and a metadata area setting request. The size of the metadata used may change depending on the host device. Each sub-metadata area may be changed depending on the metadata used by the host device after it is allocated to the corresponding host device.

In an embodiment of the present disclosure, the memory pool manager 120 may reduce a size of a sub-metadata area or change a location of the sub-metadata area based on the error information of the corresponding sub-metadata area. When the size of the metadata used by the corresponding host device becomes smaller, the memory pool manager 120 may reduce the size of the sub-metadata area.

Depending on the read operation and the write operation on the metadata, the reliability of the sub-metadata area in which the metadata is stored may be deteriorated. The memory pool manager 120 may change locations of required sub-metadata areas based on the degrees of error correction in the allocated sub-metadata areas.

The memory pool manager 120 may update the partition table in response to the changes in the sub-metadata areas. The memory pool manager 120 may perform a migration operation based on the updated partition table. The memory pool manager 120 may designate a portion in which data is not stored in the memory pool area as a temporary area, and may perform the migration operation using the temporary area.

When the metadata used by the host device increases, the memory pool manager 120 may increase the size of a required sub-metadata area. The memory pool manager 120 may additionally allocate a sub-metadata area corresponding to the increased metadata to the existing sub-metadata area, or may allocate a new sub-metadata area to the host device, the metadata of which is increased.

Figure 2:
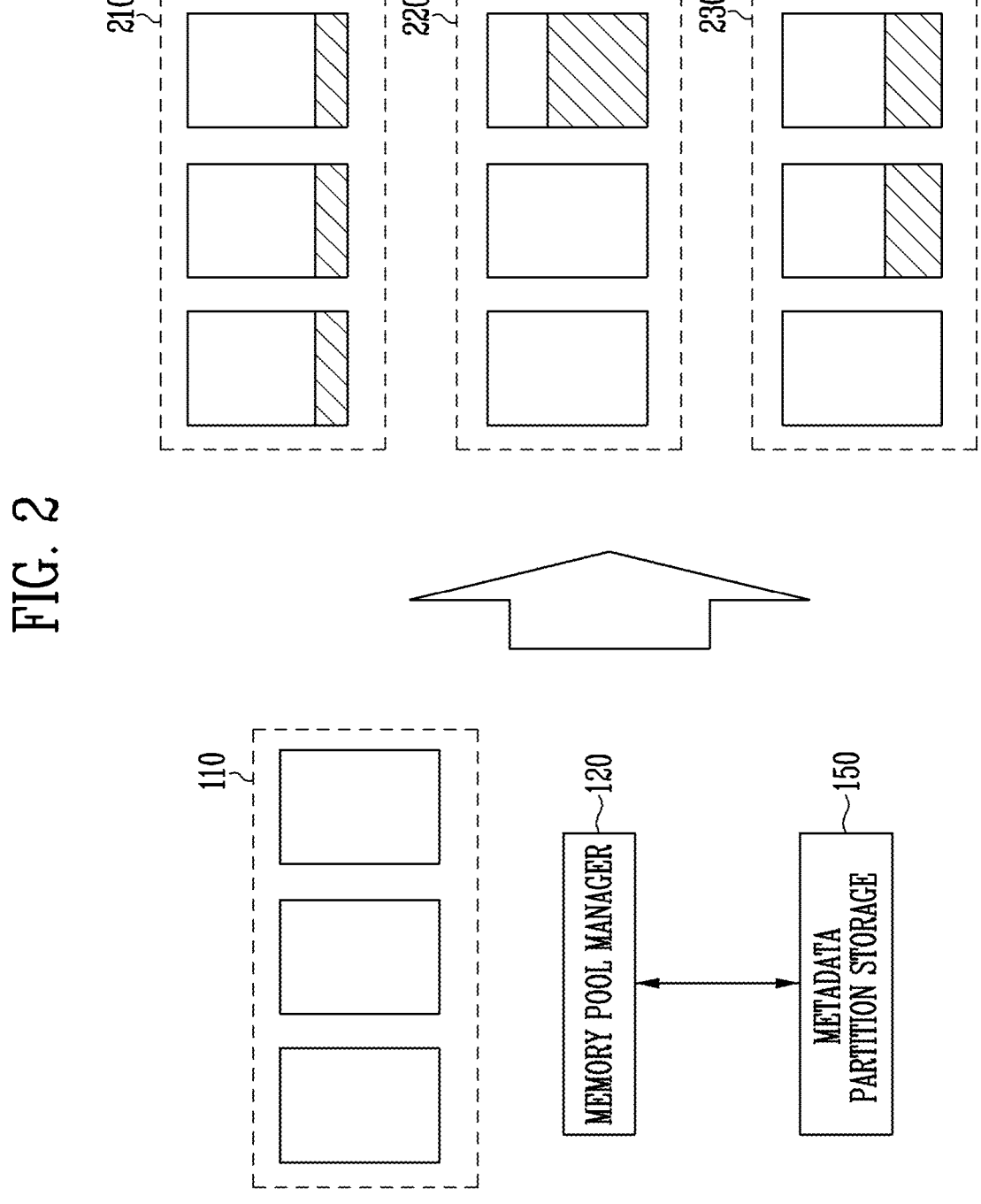
FIG. 2 is a diagram illustrating a metadata area included in a memory pool according to an embodiment of the present disclosure.

FIG. 2 is a diagram illustrating a metadata area included in a memory pool according to an embodiment of the present disclosure.

Referring to FIG. 2, the memory pool 110 may include memory devices. In FIG. 2, it is illustrated as an example that three memory devices are included in the memory pool 110 for convenience of description. The number of memory devices included in the memory pool 110 may vary. The memory devices included in the memory pool 110 may form a memory pool area. The memory pool area may include a metadata area in which pieces of metadata corresponding to host devices are stored. Hatched areas in FIG. 2 may indicate metadata areas.

The memory pool manager 120 may set the locations of metadata areas included in the memory pool area. The memory pool manager 120 may store the partition information of the metadata areas in the metadata partition storage 150.

Because metadata is more important than normal data, it may be stored in a highly-reliable area in the memory pool area. The memory pool manager 120 may obtain reliability information of the memory pool area through an initialization operation performed on the memory pool area. The memory pool manager 120 may determine a highly-reliable area in the memory pool area to be a metadata area based on the obtained reliability information.

For example, the memory pool manager 120 may set metadata areas of equal size in three memory devices. Reference numeral 210 may indicate the case where metadata areas are uniformly set in the memory devices. The memory pool manager 120 may set a metadata area in one memory device having the highest reliability among the three memory devices. Reference numeral 220 may indicate the case where a metadata area is set in only one of the memory devices included in the memory pool 110. The memory pool manager 120 may set metadata areas in only two of the three memory devices. Reference numeral 230 may indicate the case where metadata areas are set in two memory devices. Although the sizes of metadata areas set in the memory devices are illustrated as being equal to each other in FIG. 2, this illustration is only an embodiment, and the sizes of metadata areas set in respective memory devices may vary.

Figures 3, 4:
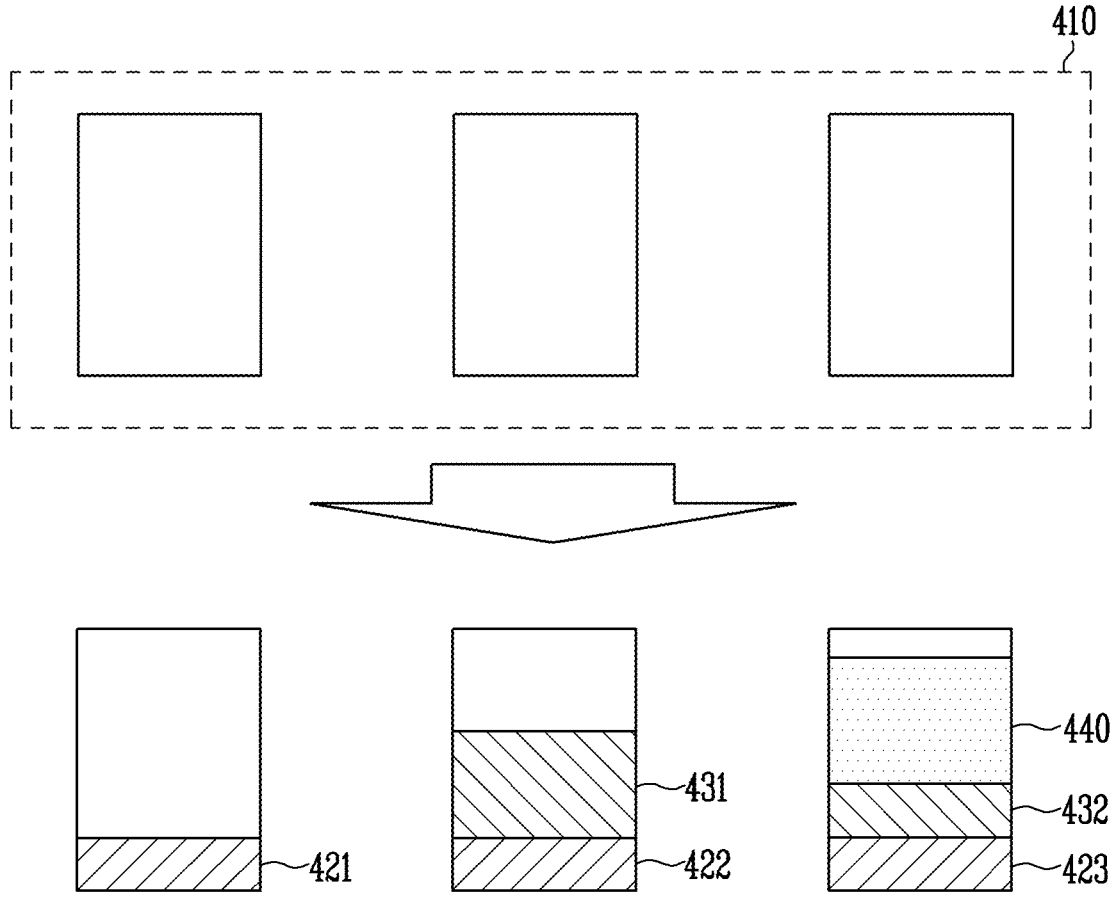
FIG. 3 is a diagram illustrating a partition table according to an embodiment of the present disclosure.
FIG. 4 is a diagram illustrating sub-metadata areas allocated to host devices according to an embodiment of the present disclosure.

FIG. 3 is a diagram illustrating a partition table according to an embodiment of the present disclosure.

Referring to FIG. 3, a partition table including partition information of a memory pool area is illustrated. The partition table may be stored in the metadata partition storage 150.

The partition table may include identification information, location information, size information, and error information of each host device. The identification information of the host device may be used to determine whether access by each host device is to be permitted. For example, the first host device 180 cannot access metadata of the second host device 190. The location information may indicate a start address of metadata. Offset sizes may indicate sizes of sub-metadata areas corresponding to respective host devices.

The error information may indicate the error status of sub-metadata areas. The memory pool manager 120 may determine a degree of error correction in each sub-metadata area based on health information received from the memory devices included in the memory pool 110. Error Status #1 and Error Status #2 illustrated in FIG. 3 may be numeric values indicating the degrees of error correction. Error Status #1 and Error Status #2 may be examples of the degrees of error correction in highly-reliable areas.

In an embodiment of the present disclosure, the partition table may be updated in response to a change in each sub-metadata area.

FIG. 4 is a diagram illustrating sub-metadata areas allocated to host devices according to an embodiment of the present disclosure.

Referring to FIG. 4, metadata areas included in a memory pool area may be allocated to respective host devices. For convenience of description, in FIG. 4, it is illustrated as an example that three memory devices are included in the memory pool 110 and the same metadata area is set in the three memory devices. Reference numeral 410 may indicate metadata areas set in three memory devices. The metadata areas may be partitioned and allocated to respective host devices. In FIG. 4, it is illustrated as an example that first sub-metadata areas 421, 422, and 423, second sub-metadata areas 431 and 432, and a third sub-metadata area 440 are allocated to the host devices.

The memory pool manager 120 may generate first sub-metadata areas 421, 422, and 423 of the same size in three memory devices, respectively. Because an operation of reading metadata stored in the first sub-metadata areas 421, 422, and 423 may be performed in an interleaving manner, the performance of the data storage system 100 may be improved. The memory pool manager 120 may generate sub-metadata areas based on the performance optimization of the data storage system 100.

The memory pool manager 120 may generate the second sub-metadata areas 431 and 432 having different sizes in two of the three memory devices. The memory pool manager 120 may generate the third sub-metadata area 440 in only one of the three memory devices.

The memory pool manager 120 may determine the locations of the sub-metadata areas in consideration of the importance of metadata. The memory pool manager 120 may generate sub-metadata areas in highly-reliable areas. The sub-metadata areas illustrated in FIG. 4 are only embodiments, and the locations and sizes of sub-metadata areas allocated to host devices may be changed.

Figure 5:
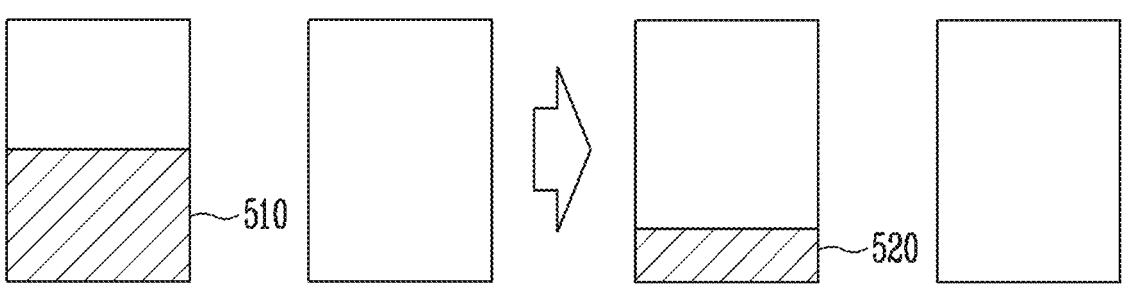
FIG. 5 is a diagram illustrating a method of reducing a size of a sub-metadata area according to an embodiment of the present disclosure.

FIG. 5 is a diagram illustrating a method of reducing a size of a sub-metadata area according to an embodiment of the present disclosure.

Referring to FIG. 5, a sub-metadata area allocated to a host device may be illustrated. For convenience of description, the number of memory devices included in a memory pool 110 illustrated in FIG. 5 is as an example 2, and only one sub-metadata area allocated to one host device is depicted. The number of allocated sub-metadata areas may vary.

In FIG. 5, a sub-metadata area 510 may be allocated to the host device. The size of the allocated sub-metadata area 510 may be reduced. For example, when metadata used in the host device is reduced or when the sub-metadata area 510 in which metadata is stored is degraded, the memory pool manager 120 may change the size and the location of the allocated sub-metadata area based on a partition table.

The memory pool manager 120 may receive a metadata area setting request received from the host manager, and may reduce the size of the sub-metadata area 510 in response to the received metadata area setting request. The reduced sub-metadata area may be indicated by reference numeral 520. Although only the size of the sub-metadata area is reduced and the location of the sub-metadata area is not changed in FIG. 5 for convenience of description, the location of the sub-metadata area may also be changed.

The memory pool manager 120 may reduce the size of the sub-metadata area 510 based on error information indicating the degree of error correction in the sub-metadata area 510. The degree of error correction in the sub-metadata area 510 may exceed a preset first reference value. The degree of error correction exceeding the first reference value may mean that the reliability of the corresponding sub-metadata area is low.

In an embodiment of the present disclosure, when there are a plurality of sub-metadata areas, the memory pool manager 120 may determine a target sub-metadata area in which the degree of error correction exceeds the first reference value, among the sub-metadata areas. The memory pool manager 120 may determine a sub-metadata area in which the degree of error correction is less than a second reference value lower than the first reference value, among the sub-metadata areas, to be the target sub-metadata area.

The memory pool manager 120 may update the partition table in response to the change in the sub-metadata area 510. The metadata manager 130 may control the memory controllers and memory devices included in the memory pool 110 to perform a migration operation on target sub-metadata based on the partition table. The memory pool manager 120 may set a portion in which data is not stored in the memory pool area as a temporary area. The metadata manager 130 may migrate the metadata stored in the sub-metadata area to the temporary area. The metadata manager 130 may migrate the temporarily stored metadata to the changed sub-metadata area 520.

Figure 6:
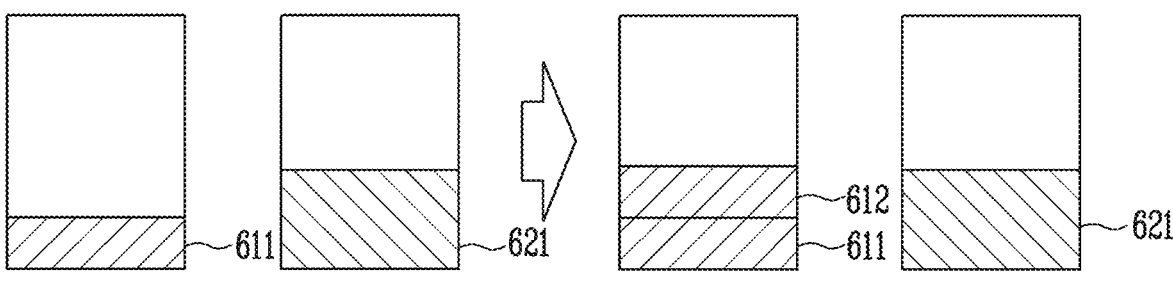
FIG. 6 is a diagram illustrating a method of increasing a size of a sub-metadata area according to an embodiment of the present disclosure.

FIG. 6 is a diagram illustrating a method of increasing a size of a sub-metadata area according to an embodiment of the present disclosure.

Referring to FIG. 6, sub-metadata areas set in a metadata area may be illustrated. For convenience of description, in FIG. 6 it is illustrated as an example that metadata areas are set in two memory devices, and among a first sub-metadata area 611 allocated to the first host device 180 and a second sub-metadata area 621 allocated to the second host device 190, the size of the first sub-metadata area 611 increases.

The memory pool manager 120 may receive a metadata area setting request indicating an increase in the first sub-metadata area 611. The memory pool manger 120 may generate a third sub-metadata area 612 in response to the metadata area setting request. The memory pool manager 120 may additionally allocate the third sub-metadata area 612 to the first host device 180. The memory pool manager 120 may determine the location of the third sub-metadata area 612 based on interleaving between the memory devices included in the memory pool 110. For example, the memory pool manager 120 may determine the location of the third sub-metadata area 612 so that an interleaving operation between the first sub-metadata area 611 and the third sub-metadata area 612 is enabled.

The memory pool manager 120 may update the partition table in response to the generation of the third sub-metadata area 612. The memory pool manager 120 may add content for the generated third sub-metadata area 612 to the partition table. Reference numeral 630 may indicate the third sub-metadata area 612 that is an additional sub-metadata area for the first host device 180.

Figure 7:
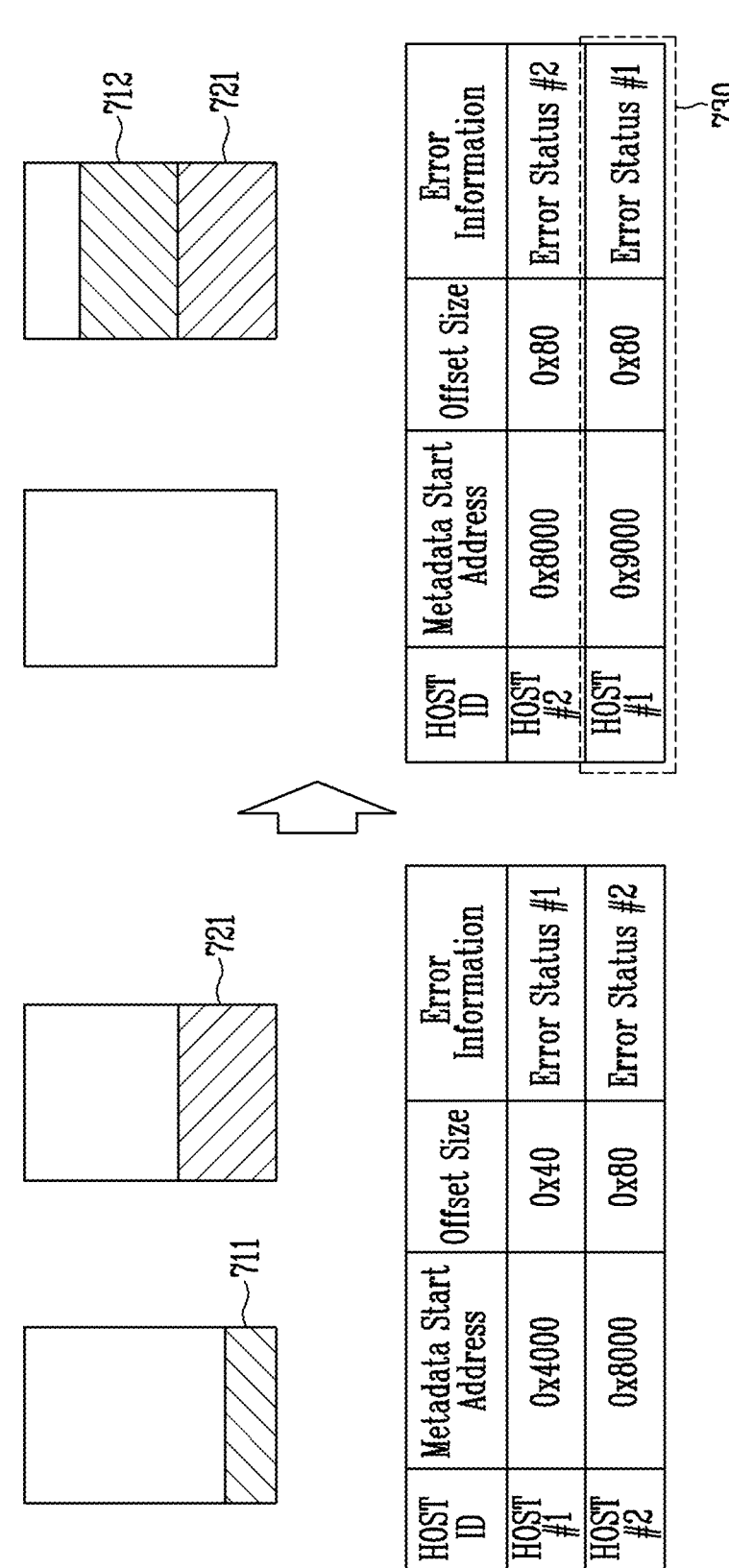
FIG. 7 is a diagram illustrating a method of increasing a size of a sub-metadata area according to an embodiment of the present disclosure.

FIG. 7 is a diagram illustrating a method of increasing a size of a sub-metadata area according to an embodiment of the present disclosure.

Referring to FIG. 7, sub-metadata areas set in metadata areas may be illustrated. Similar to FIG. 6, in FIG. 7 it is illustrated as an example that metadata areas are set in two memory devices for convenience of description, and among a first sub-metadata area 711 allocated to the first host device 180 and a second sub-metadata area 721 allocated to the second host device 190, the size of the first sub-metadata area 711 increases.

The memory pool manager 120 may receive a metadata area setting request indicating an increase in the first sub-metadata area 711. The memory pool manger 120 may generate a third sub-metadata area 712 in response to the metadata area setting request. The memory pool manager 120 may delete the first sub-metadata area 711 allocated to the first host device 180, and may allocate the newly generated third sub-metadata area 712. The memory pool manager 120 may replace the first sub-metadata area 711 allocated to the first host device 180 with the third sub-metadata area 712.

The memory pool manager 120 may update the partition table in response to the replacement of the sub-metadata area allocated to the first host device 180. The memory pool manager 120 may delete content for the deleted first sub-metadata area 711, and may add content for the newly generated third sub-metadata area 712 to the partition table. Reference numeral 730 may indicate the third sub-metadata area 712 that is a sub-metadata area newly allocated to the first host device 180. The metadata manager may migrate metadata stored in the first sub-metadata area 711 to the third sub-metadata area 712 based on the updated partition table.

Figure 8:
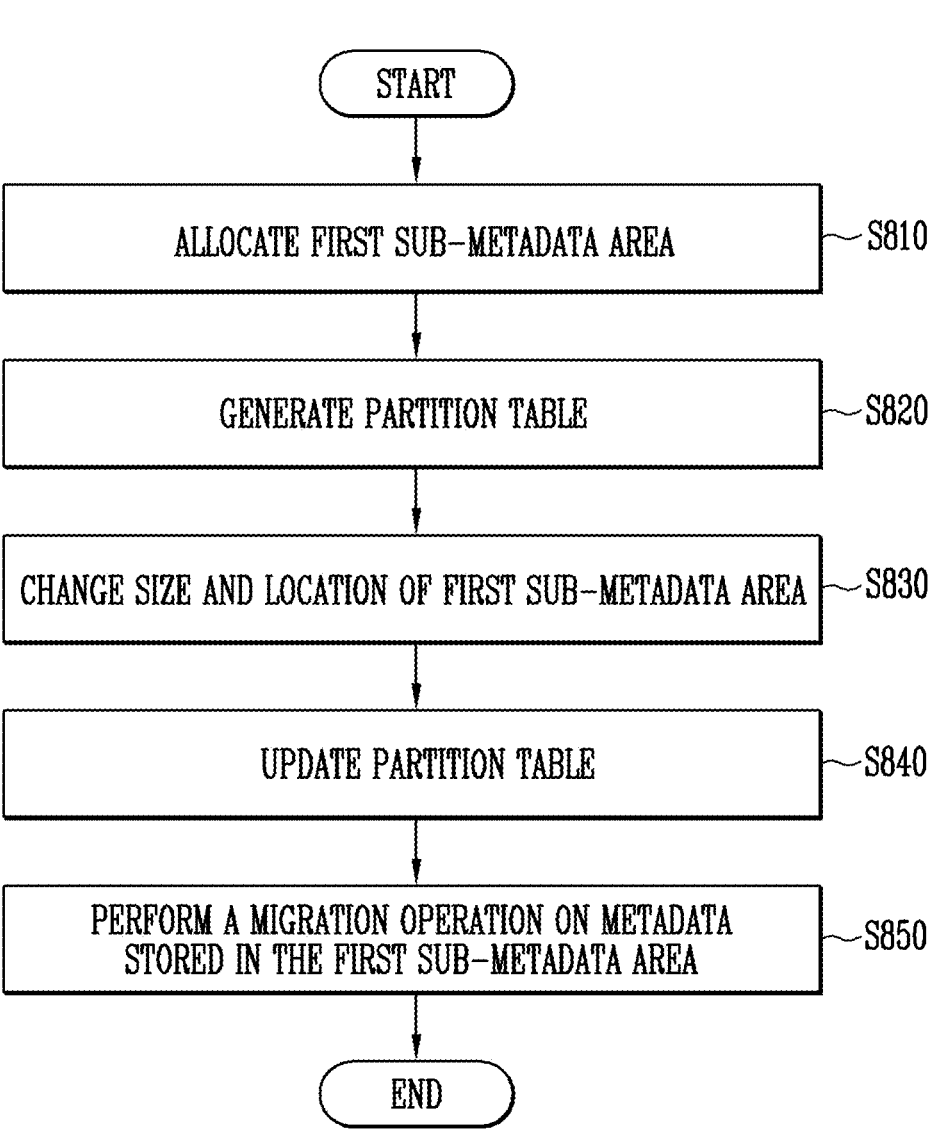
FIG. 8 is a flowchart illustrating a method of managing metadata according to an embodiment of the present disclosure.

FIG. 8 is a flowchart illustrating a method of managing metadata according to an embodiment of the present disclosure.

Referring to FIG. 8, a data storage system may dynamically change sub-metadata areas allocated to host devices.

At operation S810, a memory pool manager may allocate a first sub-metadata area, partitioned from metadata areas included in a plurality of memory devices, to a host device to which a partial data storage area of data storage areas included in the plurality of memory devices is allocated among a plurality of host devices based on initial setting information. The memory pool manager may determine the size of each sub-metadata area based on metadata capacity preset for each of the host devices. The memory pool manager may determine an area determined based on the degree of error correction in the metadata area to be a first sub-metadata area.

At operation S820, the memory pool manager may generate a partition table including partition information of the metadata area. The partition table may include identification information, location information, size information, and error information of the host device, which correspond to the first sub-metadata area. The memory pool manager may generate error information indicating the degree of error correction in the first sub-metadata area based on health information of the memory devices.

At operation S830, the memory pool manager may change a size and a location of the first sub-metadata area based on at least one of the health information of the memory devices and a metadata area setting request. In an embodiment of the present disclosure, the memory pool manager may reduce the size of the first sub-metadata area in response to the degree of error correction exceeding a preset first reference value based on the error information. In an embodiment of the present disclosure, the memory pool manager may allocate a second sub-metadata area to the host device corresponding to the first sub-metadata area or may additionally allocate the second sub-metadata area to the host device corresponding to the first sub-metadata area, in accordance with the case where the size of the first sub-metadata area increases in response to a metadata area setting request. The description of the change in the sub-metadata area may correspond to the descriptions of FIGS. 5, 6, and 7.

At operation S840, the memory pool manager may update the partition table in response to the change in the first sub-metadata area.

At operation S850, the metadata manager may perform a migration operation on metadata stored in the first sub-metadata area. The memory pool manager may allocate a portion in which data is not stored in a data storage area as a temporary area. The metadata manager may migrate the metadata stored in the first sub-metadata area to the temporary area. The metadata manager may store the metadata stored in the temporary area at the changed location of the first sub-metadata area based on the updated partition table.

According to embodiments of the present disclosure, there can be provided a data storage system and a method of managing metadata thereof, which can dynamically operate a metadata area by applying pieces of metadata having different sizes to respective host devices.

The scope of the present disclosure is defined by the accompanying claims, rather than by the detailed description, and all modifications or changes derived from the meaning and scope of the claims and equivalents thereof should be construed as falling within the scope of the present disclosure. Furthermore, the embodiments may be combined to form additional embodiments.

What is claimed is:

1. A data storage system comprising:
a plurality of memory devices, each including a metadata area and a data storage area; and
a memory pool manager configured to allocate partial data storage areas of data storage areas to a plurality of host devices, respectively, in response to data storage area allocation requests received from the plurality of host devices,
wherein the memory pool manager is configured to:
generate a plurality of sub-metadata areas by partitioning each metadata area;
allocate the plurality of sub-metadata areas to the plurality of host devices, respectively, to correspond to the partial data storage areas allocated to the plurality of host devices, respectively; and
change sizes and locations of the plurality of sub-metadata areas based on at least one of health information of the plurality of memory devices and a metadata area setting request received from the plurality of host devices.

2. The data storage system according to claim 1, further comprising a metadata partition storage configured to store a partition table including location information, size information, error information, and identification information of an allocated host device among the plurality of host devices, which correspond to each of the plurality of sub-metadata areas.

3. The data storage system according to claim 2, wherein the memory pool manager is configured to generate the error information corresponding to each of the plurality of sub-metadata areas based on health information of the plurality of memory devices.

4. The data storage system according to claim 3, further comprising a metadata manager configured to control the plurality of memory devices to store metadata corresponding to each of the plurality of host devices in the sub-metadata areas based on the partition table.

5. The data storage system according to claim 4, wherein the metadata manager is configured to:
determine, based on the partition table, a sub-metadata area corresponding to a read request or a write request for the data storage area, among the plurality of sub-metadata areas, in response to the read request or the write request for the data storage area; and
generate a read request or a write request for metadata in the sub-metadata area corresponding to the read request or the write request.

6. The data storage system according to claim 4, wherein the memory pool manager is configured to:
generate the error information based on degrees of error correction in the plurality of sub-metadata areas; and
determine a sub-metadata area, in which a degree of error correction exceeds a preset first reference value, among the plurality of sub-metadata areas, to be a target sub-metadata area.

7. The data storage system according to claim 6, wherein the memory pool manager is configured to:
reduce a size of the target sub-metadata area;
change a location of the target sub-metadata area to a sub-metadata area in which a degree of error correction is less than a second reference value lower than the first reference value, among the plurality of sub-metadata areas; and
update the partition table.

8. The data storage system according to claim 7, wherein the metadata manager is configured to control the plurality of memory devices to perform a migration operation of migrating the metadata stored in the target sub-metadata area to the changed sub-metadata area based on the updated partition table.

9. The data storage system according to claim 8, wherein the memory pool manager is configured to allocate a portion in which data is not stored in the data storage area as a temporary area, and
wherein the metadata manager is configured to control the migration operation to be performed using the temporary area.

10. The data storage system according to claim 4, wherein the memory pool manager is configured to, in a case where a size of a first sub-metadata area among the plurality of sub-metadata areas increases in response to the metadata area setting request, change the first sub-metadata area to a second sub-metadata area and update the partition table, and
wherein the metadata manager is configured to migrate metadata stored in the first sub-metadata area to the second sub-metadata area based on the updated partition table.

11. The data storage system according to claim 4, wherein the memory pool manager is configured to:
in response to the metadata area setting request received from a host device to which a first sub-metadata area among the plurality of sub-metadata areas is allocated, additionally allocate a second sub-metadata area among the plurality sub-metadata areas; and determine a location of the second sub-metadata area according to whether an interleaving operation with the first sub-metadata area is enabled.

12. The data storage system according to claim 2, wherein the memory pool manager is configured to update the partition table in response to a change in a size and a location of each of the plurality of sub-metadata areas.

13. A method of operating a data storage system, the method comprising:

allocating a first sub-metadata area, partitioned from metadata areas included in a plurality of memory devices, to a host device to which a partial data storage area of data storage areas included in the plurality of memory devices is allocated, among a plurality of host devices, based on initial setting information;

generating a partition table including partition information of the metadata area;

changing a size and a location of the first sub-metadata area based on at least one of health information of the plurality of memory devices and a metadata area setting request;

updating the partition table in response to the changed first sub-metadata area; and performing a migration operation on metadata stored in the first sub-metadata area.

14. The method according to claim 13, wherein allocating the first sub-metadata area comprises:

determining the size of the first sub-metadata area based on a metadata capacity preset for each of the plurality of host devices; and determining an area determined based on a degree of error correction in the metadata area to be the first sub-metadata area.

15. The method according to claim 13, wherein the partition table includes identification information, location information, size information, and error information of a host device corresponding to the first sub-metadata area, among the plurality of host devices, and wherein generating the partition table comprises generating the error information indicating a degree of error correction in the first sub-metadata area based on health information of the plurality of memory devices.

16. The method according to claim 15, wherein the changing the size and the location of the first sub-metadata area comprises:

reducing the size of the first sub-metadata area in response to the degree of error correction exceeding a preset first reference value based on the error information;

changing the location of the first sub-metadata area to a partial area of the metadata area in which the degree of error correction is less than a second reference value lower than the first reference value; and updating the partition table in response to the change in the first sub-metadata area.

17. The method according to claim 15, wherein changing the size and the location of the first sub-metadata area comprises:

in a case where the size of the first sub-metadata area increases in response to the metadata area setting request, allocating a second sub-metadata area partitioned from the metadata area to a host device corresponding to the first sub-metadata area;

determining a location of the second sub-metadata area in the metadata area based on a size of the second sub-metadata area; and changing the first sub-metadata area to the second sub-metadata area.

18. The method according to claim 15, wherein changing the size and the location of the first sub-metadata area comprises:

in a case where the size of the first sub-metadata area increases in response to the metadata area setting request, additionally allocating a second sub-metadata area that is a partial area of the metadata area to a host device corresponding to the first sub-metadata area; and determining a location of the second sub-metadata area according to whether an interleaving operation with the first sub-metadata area is enabled.

19. The method according to claim 13, wherein performing the migration operation comprises:

allocating a portion in which data is not stored in the data storage area as a temporary area;

migrating metadata stored in the first sub-metadata area to the temporary area; and storing the metadata stored in the temporary area at a changed location of the first sub-metadata area based on the updated partition table.

20. A data storage system comprising a plurality of memory devices, wherein the data storage system is configured to:

allocate a first sub-metadata area, partitioned from metadata areas included in the plurality of memory devices, to a host device to which a partial data area among data storage areas included in the plurality of memory devices is allocated, among a plurality of host devices, based on initial setting information;

generate a partition table including partition information of the metadata area;

change a size and a location of the first sub-metadata area based on at least one of health information of the plurality of memory devices and a metadata area setting request;

update the partition table in response to the changed first sub-metadata area; and perform a migration operation on metadata stored in the first sub-metadata area.

* * * * *